(12) United States Patent
Machida

(10) Patent No.: US 9,403,420 B2
(45) Date of Patent: Aug. 2, 2016

(54) SUN VISOR HOLDER

(71) Applicant: PIOLAX, INC., Yokohama-shi (JP)

(72) Inventor: Kazunori Machida, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/438,484

(22) PCT Filed: Oct. 17, 2013

(86) PCT No.: PCT/JP2013/078137
§ 371 (c)(1),
(2) Date: Apr. 24, 2015

(87) PCT Pub. No.: WO2014/065179
PCT Pub. Date: May 1, 2014

(65) Prior Publication Data
US 2015/0283884 A1 Oct. 8, 2015

(30) Foreign Application Priority Data
Oct. 25, 2012 (JP) .................................. 2012-235342

(51) Int. Cl.
*B60J 3/00* (2006.01)
*B60J 3/02* (2006.01)
*F16B 5/12* (2006.01)
*F16B 21/08* (2006.01)

(52) U.S. Cl.
CPC ................. *B60J 3/023* (2013.01); *F16B 5/123* (2013.01); *F16B 21/086* (2013.01)

(58) Field of Classification Search
CPC ......... B60J 3/0217; B60J 3/0221; B60J 3/023
USPC ............................................ 296/97.9, 97.12
See application file for complete search history.

(56) References Cited

U.S. PATENT DOCUMENTS

| 6,324,732 B1 * | 12/2001 | Arisaka .................... B60J 3/023 24/453 |
| 2002/0017799 A1 | 2/2002 | Asai et al. |
| 2002/0017800 A1 * | 2/2002 | Ichikawa ................. B60J 3/023 296/97.9 |
| 2009/0039669 A1 | 2/2009 | Takai |

FOREIGN PATENT DOCUMENTS

| JP | 10-058971 A | 3/1998 |
| JP | 2001-322430 A | 11/2001 |
| JP | 2006-234138 A | 9/2006 |
| JP | 2008-290566 A | 12/2008 |
| JP | 2010-151179 A | 7/2010 |

OTHER PUBLICATIONS

Translation of PCT/IPEA/408 for PCT/JP2013/078137, Jun. 21, 2016.*
International Search Report (ISR) (PCT Form PCT/ISA/210), in PCT/JP2013/078137, dated Jan. 7, 2014.
IPER—Nov. 11, 2014.
IPER—Feb. 10, 2015.

* cited by examiner

*Primary Examiner* — Jason S Morrow
(74) *Attorney, Agent, or Firm* — McGinn IP Law Group, PLLC

(57) ABSTRACT

A sun visor holder includes a main body section to receive the shaft and a leg section to engage with the inner wall of the vehicle. A first engaging piece is formed with the tip side of the leg section as a fulcrum so as to be bendable inward, includes a release section that extends outward along the mounting surface of an inner wall from the free-end side of said first engaging piece, and is configured so that pressing the release section from the surface side of the inner wall causes the first engaging piece to bend inward and engagement with a mounting hole is released.

4 Claims, 18 Drawing Sheets

SUN VISOR HOLDER

TECHNICAL FIELD

The present invention relates to a sunvisor holder to be mounted on a vehicle inside wall so as to hold a shaft of a sunvisor holder in an attachable and detachable manner.

BACKGROUND ART

For example, a sunvisor for protecting the eyes of a passenger from sunlight or the like is provided to a vehicle. The sunvisor includes a shaft protruding from both ends in a longitudinal direction of the sunvisor, the shaft being held rotatably in an attachable and detachable manner by a pair of sunvisor holders mounted on a vehicle inside wall. The sunvisor is rotated when used and disposed in front of the field of vision of a passenger.

For example, as a structure for mounting the above-described sunvisor holders on a vehicle inside wall, Patent Literature 1 describes a sunvisor holder mounting structure. The sunvisor holder mounting structure includes a sunvisor holder. The sunvisor holder includes, as an upper part, a pawl portion elastically deforming in a vertical direction of the vehicle, a clip portion elastically deforming in a back/forth direction of the vehicle, and a stopper portion abutting on an opening edge of a molded ceiling, and includes, as a lower part, a hook portion holding a sunvisor shaft, on the lower part. The sunvisor holder is mounted on the vehicle by being inserted into an opening portion provided to the molded ceiling by abutting the stopper portion against the opening edge to be positioned then sandwiching the molded ceiling by the pawl portion while pressing the clip portion into the opening edge.

The above-described clip portion is disposed at a base portion of the sunvisor holder on the front side of the vehicle. The clip portion includes a long-plate-shaped stem portion raised from the lower surface of the base portion, and an engaging piece extending obliquely downward from the upper end of the stem portion. The lower end portion of the engaging piece is bent into a V-like shape.

The pawl portion is inserted into the opening portion of a ceiling member and a vehicle body panel, and while the pawl portion hooks the upper peripheral edge of the opening portion, the clip is inserted from beneath of the opening portion to make the lower end portion of the engaging piece engage with the peripheral edge of the opening portion, so that the sunvisor holder is mounted on the opening portion.

On the rear side of the vehicle that is on the opposite side to the above-described clip, the sunvisor holder includes a J-like-shaped hook portion opened rearward of the vehicle. By pushing the shaft of the sunvisor into the opening of the hook portion, the shaft is held rotatably.

CITATION LIST

Patent Literature

Patent Document 1
JP-H10-058971-A

SUMMARY OF THE INVENTION

Problem that the Invention is to Solve

The above-described sunvisor holder sometimes needs to be demounted from the vehicle inside wall for the reason of component replacement, maintenance, recycling, or the like. In this case, in the structure of Patent Literature 1, it is necessary to push the lower end portion of the engaging piece of the clip portion toward the holder base portion for disengaging the lower end portion from the peripheral edge of the opening portion of the ceiling member and the vehicle body panel, so that the clip portion is disengaged from the opening portion, and while maintaining this state, pull the clip portion out of the opening portion.

However, the stem portion and the engaging piece of the above-described clip portion are inserted upward with respect to the opening portion, and only the lower end portion of the engaging piece protrudes from beneath of the opening portion. Further the protruding amount of the clip portion from the opening portion is small, and a margin of the clip lower end portion to be pushed toward the holder base portion is also small. Thus, it is cumbersome to release the engagement of the clip portion from the opening portion.

In addition, when the shaft of the sunvisor is pushed into the opening of the hook portion in order to mount the shaft of the sunvisor on the sunvisor holder, pressing force by the shaft is exerted along the mounting surface of the ceiling member. In this moment, the engaging piece of the clip member, which is inserted from beneath the opening portion of the ceiling member, raises with respect to the mounting surface of the ceiling member, therefore the engaging piece may be bent by the pressing force by the shaft, and the sunvisor holder may be inclined with respect to the mounting surface of the ceiling member.

An object of the present invention is to provide a sunvisor holder that is easily demountable from a vehicle inside wall, and durable to such an inclination with respect to a mounting surface of the vehicle inside wall when a shaft of a sunvisor is inserted into the sunvisor holder.

Means for Solving the Problem

In order to achieve the object described above, the present invention provides a sunvisor holder to be mounted on a vehicle inside wall via a mounting hole provided to a vehicle body panel so as to hold a shaft of a sunvisor in an attachable and detachable manner, the sunvisor holder including:

a main body portion disposed on a top side of the vehicle inside wall; and a leg portion to be inserted into and fixed to the mounting hole of the vehicle body panel, wherein the main body portion includes:

a base portion to be abutted on the top side of the vehicle inside wall;

a holding portion extending from the base portion and being shaped so as to hold the shaft of the sunvisor in an attachable and detachable manner; and an insertion portion provided to the holding portion so as to receive the shaft of the sunvisor, wherein the leg portion includes:

a first engaging piece disposed on a side opposite to the insertion portion of the main body portion so as to engage with the mounting hole; and at least one second engaging piece disposed at a position different from the first engaging piece so as to engage with the mounting hole in a collaborative manner with the first engaging piece, wherein the first engaging piece is bendable inward with a distal end of the leg portion as a pivot point, and includes a releasing portion extending outward along a mounting surface of the vehicle inside wall from a free end of the first engaging piece, and wherein, when the releasing portion is pressed from the top side of the vehicle inside wall, the first engaging piece is bent inward to release an engagement of the first engaging piece with the mounting hole.

The present invention may further provide the sunvisor, wherein a length of the releasing portion is set so as to protrude from an outer peripheral surface of the base portion in a state where the releasing portion is pressed and the engagement of the first engaging piece with the mounting hole is released.

The present invention may further provide the sunvisor, wherein the leg portion includes a frame-shaped wall defining an interior space, and the base portion defines a cavity communicating with the interior space, wherein the first engaging piece and the releasing portion are provided via a notch communicating with the interior space of the frame-shaped wall and the cavity of the base portion, and wherein, when the releasing portion is pressed, the first engaging piece is pushed into the interior space of the frame-shaped wall and the cavity of the base portion.

The present invention may further provide the sunvisor, wherein the vehicle inside wall includes a trim member including an insertion hole and disposed on a top side of the panel member, wherein the leg portion includes a temporary holding piece provided to engage with a back-side peripheral edge of the insertion hole of the trim member, and wherein, when the temporary holding piece engages with the back-side peripheral edge of the insertion hole, the releasing portion abuts on a top side of the trim member.

Advantageous Effects of Invention

According to the present invention, inserting the leg portion into the mounting hole of the vehicle body panel makes the first engaging piece and the second engaging piece engage with the back-side peripheral edge of the mounting hole while the base portion of the main body portion abuts on the top side of the vehicle inside wall, and thus the sunvisor holder can be mounted on the mounting hole. By inserting the shaft of the sunvisor into the holding portion through the insertion portion in this state, the shaft is held by the holding portion in an attachable and detachable manner, and thus the sunvisor can be fixed.

When the shaft of the sunvisor is inserted into the holding portion through the insertion portion as described above, a pressure force is exerted on the sunvisor holder. However, since the first engaging piece is provided to the leg portion on the side opposite to the insertion portion, while the releasing portion extends outward along the mounting surface of the vehicle inside wall from the free end of the first engaging portion, thereby the releasing portion abuts on the top side of the vehicle inside wall to receive the pushing force by the shaft, which can prevent the sunvisor holder from getting inclined.

In a case where the sunvisor holder needs to be demounted for the need of maintenance or the like, pressing the releasing portion from the top side of the vehicle inside wall bends the first engaging piece inward to release the engagement of the first engaging piece with the mounting hole. Thus, the leg portion can be pulled out of the mounting hole, which allows the sunvisor holder to be demounted. At this time, pressing the releasing portion has its distal end raise with respect to the mounting surface of the vehicle inside wall, so that an operator's finger is easily hooked on the distal end of the releasing portion, which realizes an easy demounting operation.

MODE FOR CARRYING OUT THE INVENTION

Figure 1:
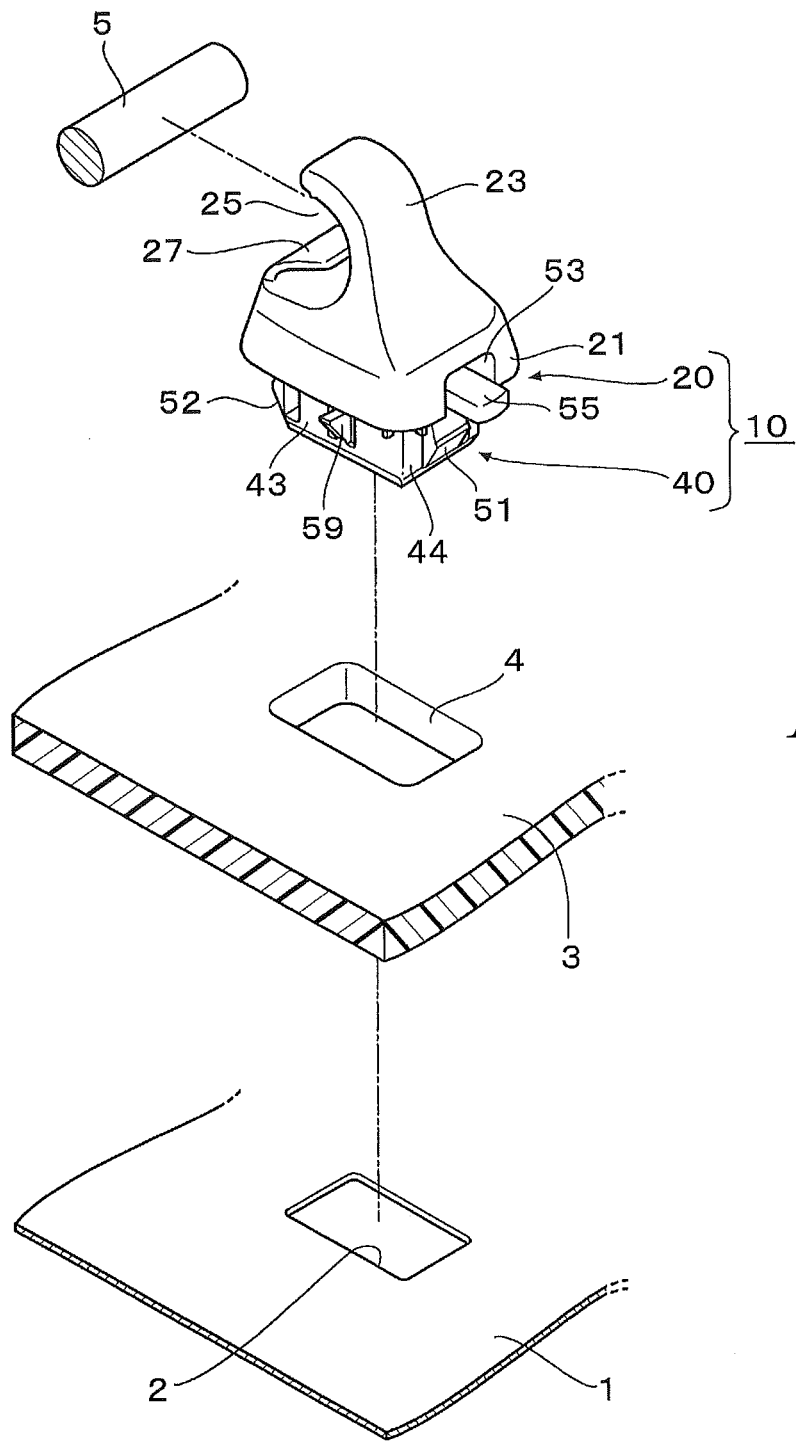
FIG. 1 is a perspective view of a sunvisor holder according to one embodiment of the present invention.

Hereinafter, a sunvisor holder according to one embodiment of the present invention will be described referring to the drawings.

As shown in FIG. 1, a sunvisor holder 10 according to the present embodiment is mounted on a vehicle inside wall via a rectangle-shaped mounting hole 2 provided to a vehicle body panel 1 so as to hold rotatably shafts 5 protruding from both ends in a longitudinal direction of a sunvisor (not illustrated) in an attachable and detachable manner. A trim member 3 overlaps the top side of the vehicle body panel 1, and includes a rectangle-shaped insertion hole 4 larger than the mounting hole 2 of the vehicle body panel 1. The trim member 3 functions as "the vehicle inside wall" according to the present invention. The top surface of the trim member 3 functions as "the mounting surface of the vehicle inside wall" according to the present invention.

Figures 2A, 2B:
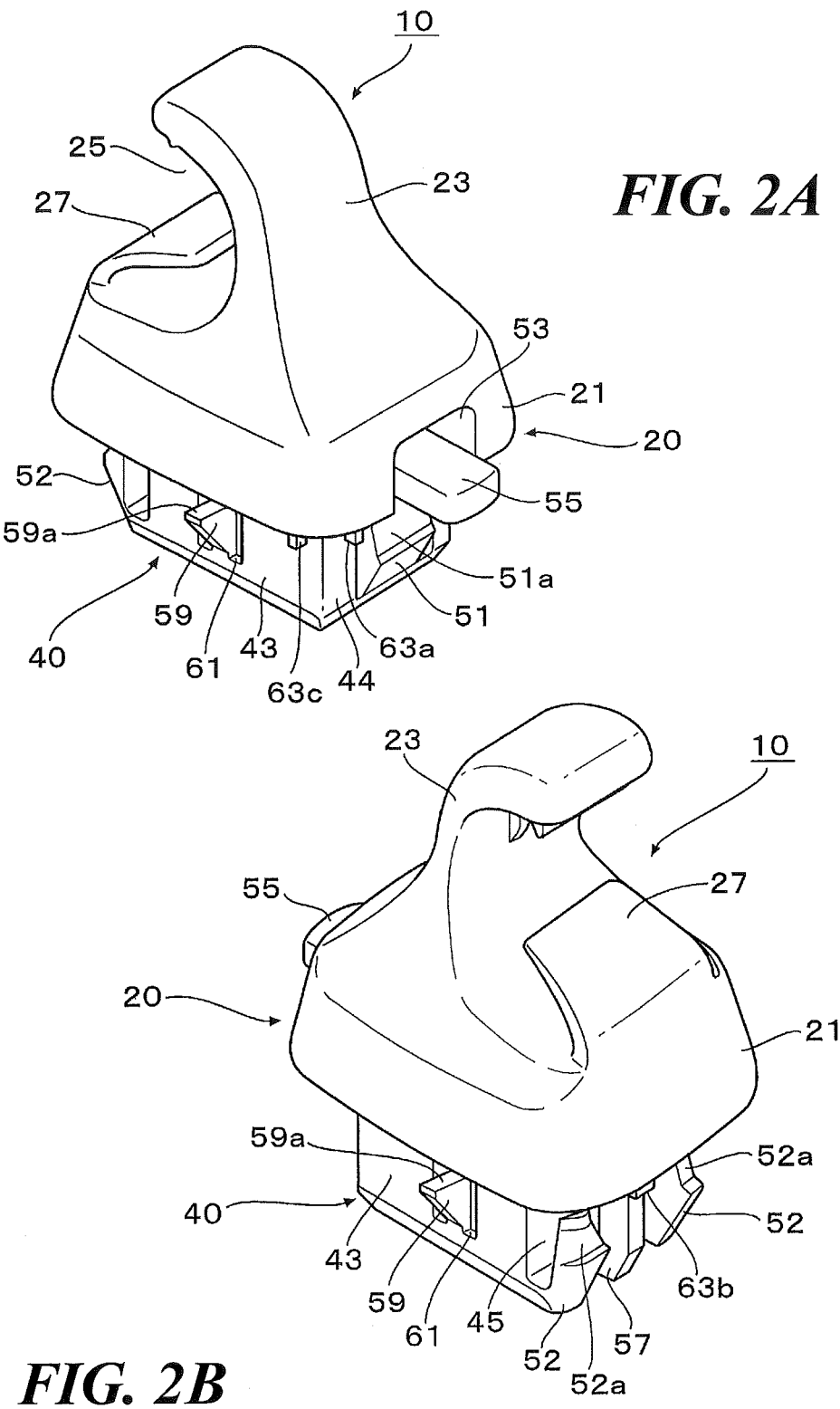
FIG. 2A is an enlarged perspective view of the sunvisor holder.
FIG. 2B is an enlarged perspective view of the sunvisor holder seen from a direction different from FIG. 2A.

With reference also to FIGS. 2A and 2B, the sunvisor holder 10 according to the present embodiment includes a main body portion 20 disposed on the top side of the trim member 3, and a leg portion 40 inserted into and fixed to the mounting hole 2 of the vehicle body panel 1 via the insertion hole 4 of the trim member 3.

The main body portion 20 has a rectangular shape extending in one direction, and includes a base portion 21 abutting on the top side of the trim member 3, a holding portion 23 extending from a portion close to one end in the longitudinal direction of the base portion 21 into the shape of the letter C in cross section so as to hold the shaft 5 of the sunvisor (not illustrated) in an attachable and detachable manner, and an insertion portion 25 provided inside of the holding portion 23 so as to receive the shaft 5 of the sunvisor.

Figure 3A:
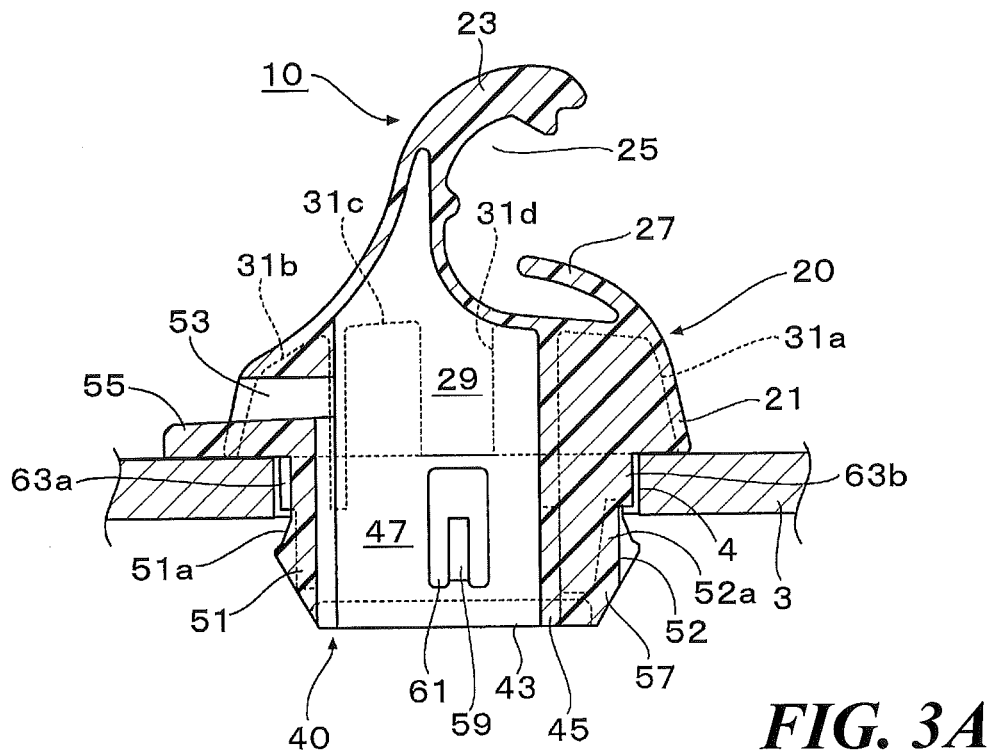
FIG. 3A is a cross-sectional view of the sunvisor holder in the state of being temporarily held by a trim member.

As shown in FIG. 3A, a presser piece 27 extends from the other end in the longitudinal direction of the base portion 21 and curved toward the insertion portion 25. The presser piece 27 abuts elastically on the outer circumference of the shaft 5 of the sunvisor to retain the shaft 5, and prevents rattling of the shaft 5 (see FIG. 4A).

As shown in FIGS. 2A, 2B, 3A, 3B, and 9, the leg portion 40 includes a pair of side walls 43 and 43 disposed along the longitudinal direction of the base portion 21 so as to be opposed parallel to each other, and connecting walls 44 and 45 that connect both end portions of the pair of side walls 43 and 43. The leg portion 40 is open on the distal end side, and has a rectangular frame shape defining an interior space 47 in its interior. The base portion 21 of the main body portion 20 defines a cavity 29 communicating with the interior space 47 (see FIG. 3A). The cavity 29 is defined so as to reach the upper portion of the holding portion 23 of the main body portion 20 through the base portion 21 (see FIG. 3A).

Figure 9:
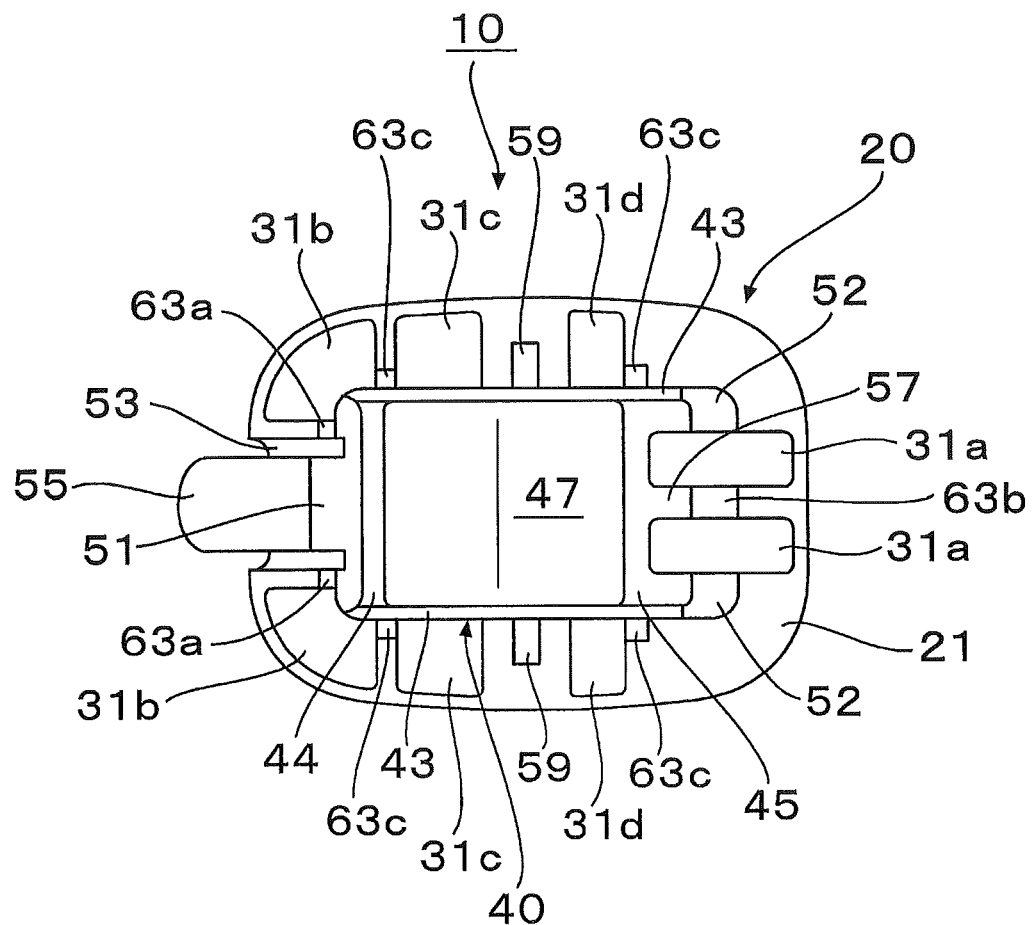
FIG. 9 is a bottom view of the sunvisor holder.

Plural lightening holes are provided to the base portion 21 of the main body portion 20 around the leg portion 40. To be specific, a pair of lightening holes 31a and 31a are provided to the base portion 21 on the other end side in the longitudinal direction, lightening holes 31b and 31b are provided to the base portion 21 on both corners on one end side in the longitudinal direction, and lightening holes 31c and 31d are provided to the base portion 21 on both sides in the longitudinal direction, as shown in FIGS. 3A and 9.

Turning back to the explanation of the leg portion 40, the leg portion 40 includes a first engaging piece 51 disposed on the side opposite to the insertion portion 25 of the main body portion 20 so as to engage with the mounting hole 2, and a pair of second engaging pieces 52 and 52 disposed at positions different from the first engaging piece 51 so as to engage with the mounting hole 2 in a collaborative manner with the first engaging piece 51 (see FIGS. 2A to 3B).

Figure 3B:
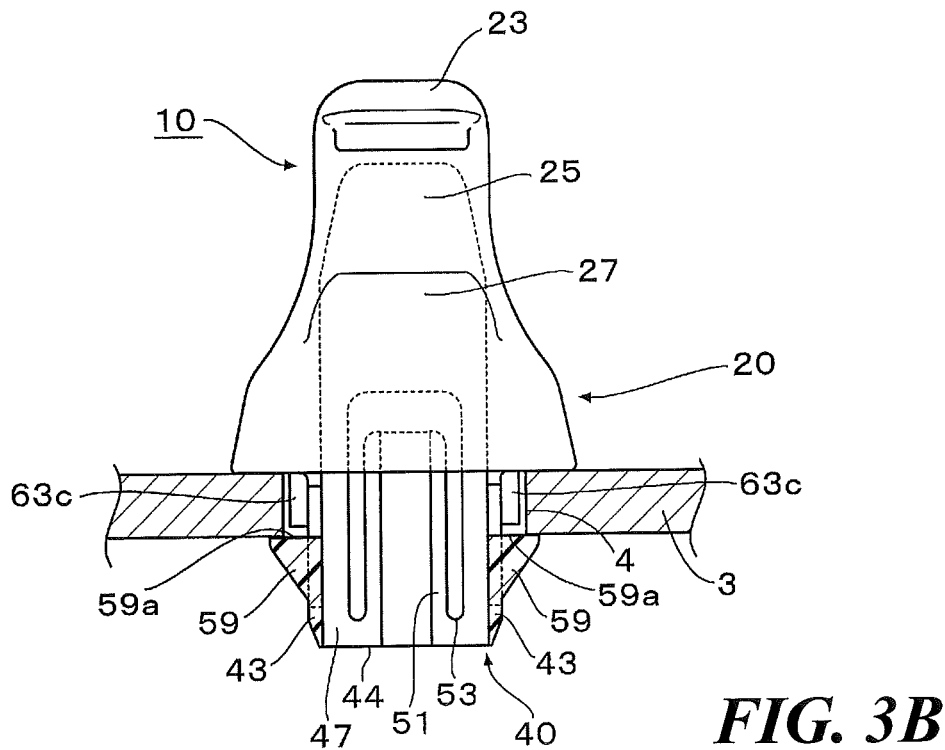
FIG. 3B is a side view of the sunvisor holder in the temporarily holding state where only the leg portion is shown in cross section.
Figure 11:
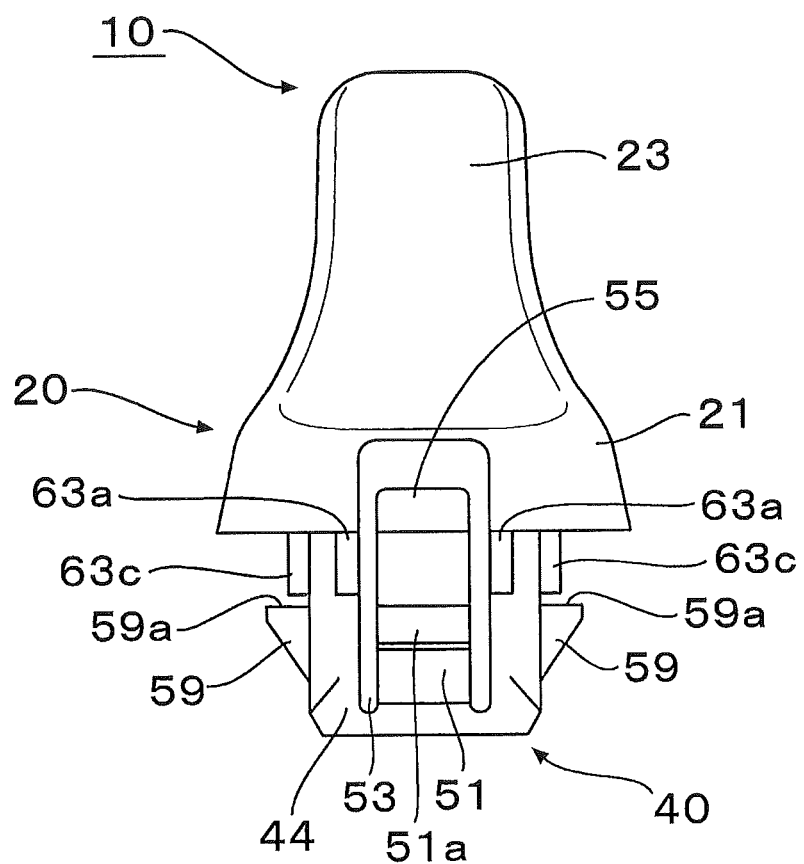
FIG. 11 is a left side view of the sunvisor holder.
Figure 12:
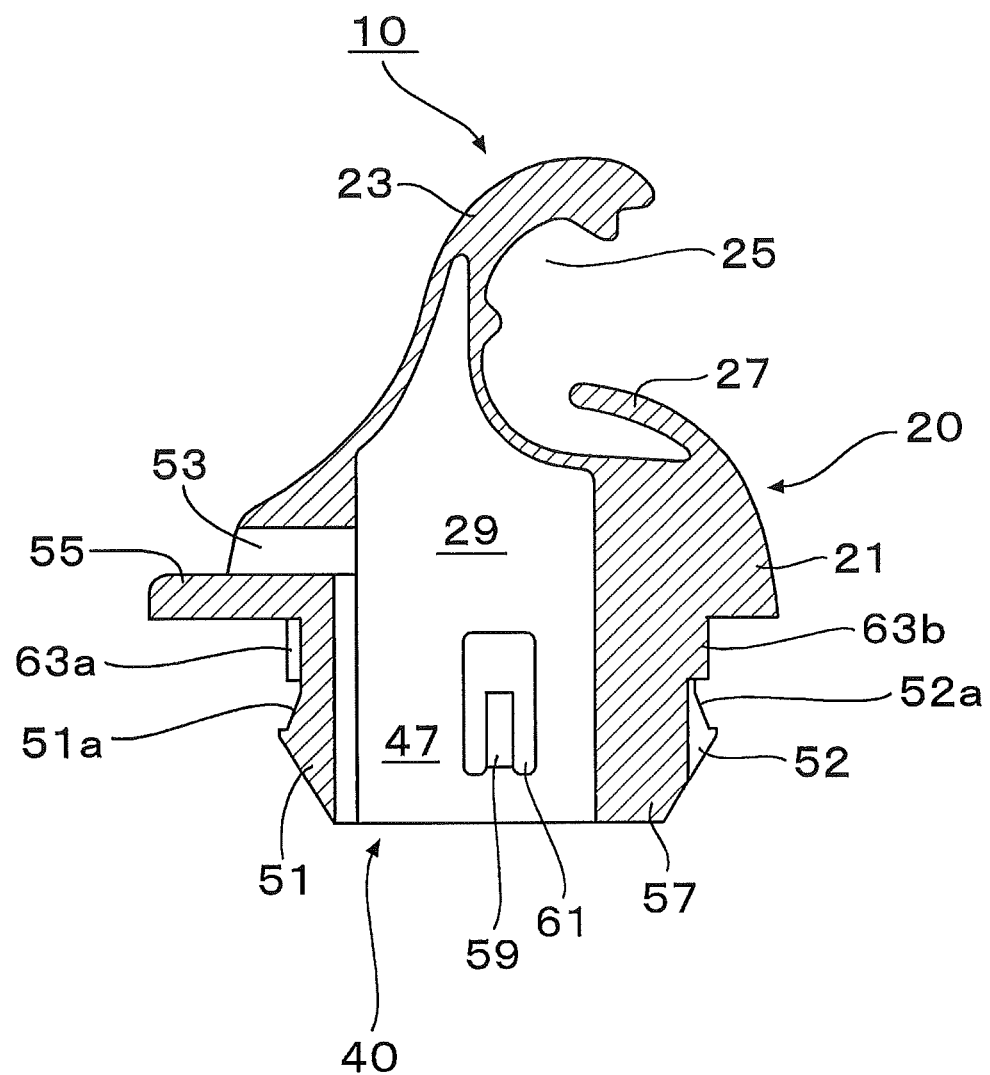
FIG. 12 is a cross-sectional view taken along the arrow line A-A of FIG. 8.
Figure 13:
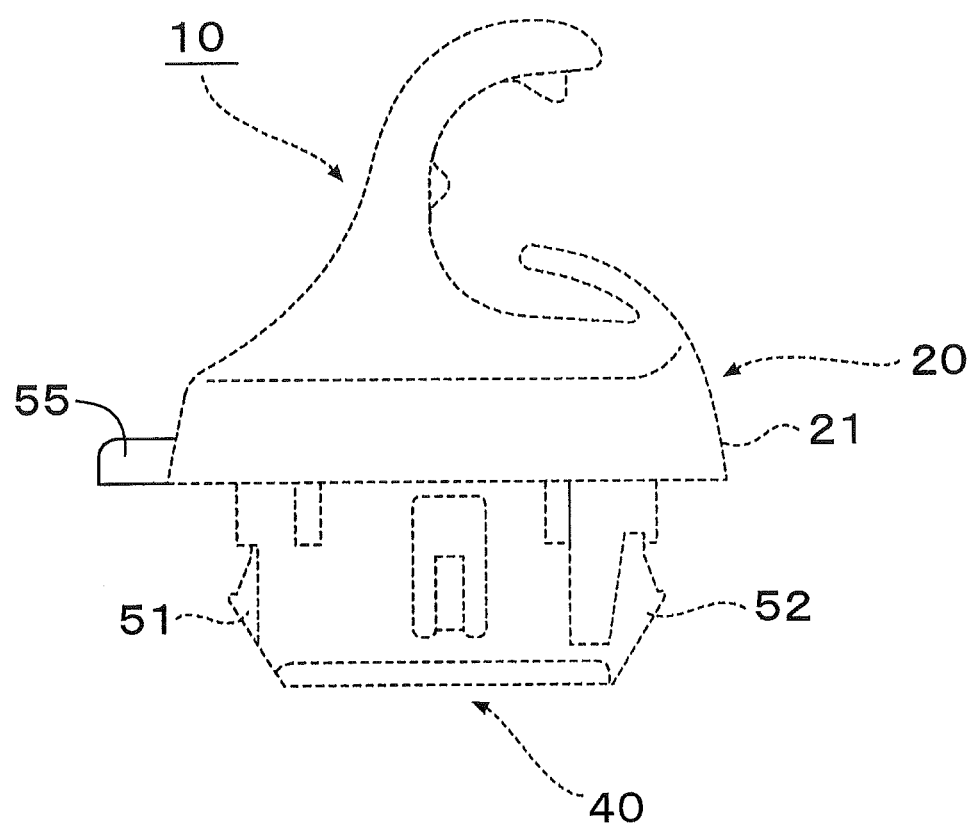
FIG. 13 is a front view of the sunvisor holder.
Figure 14:
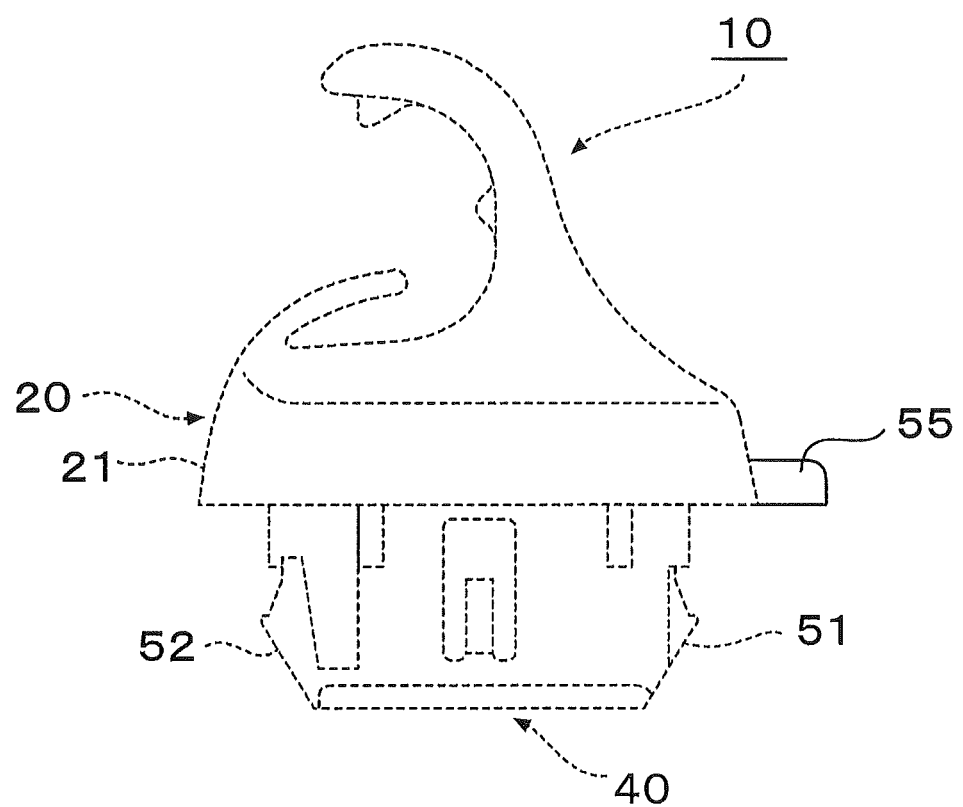
FIG. 14 is a rear view of the sunvisor holder.
Figure 15:
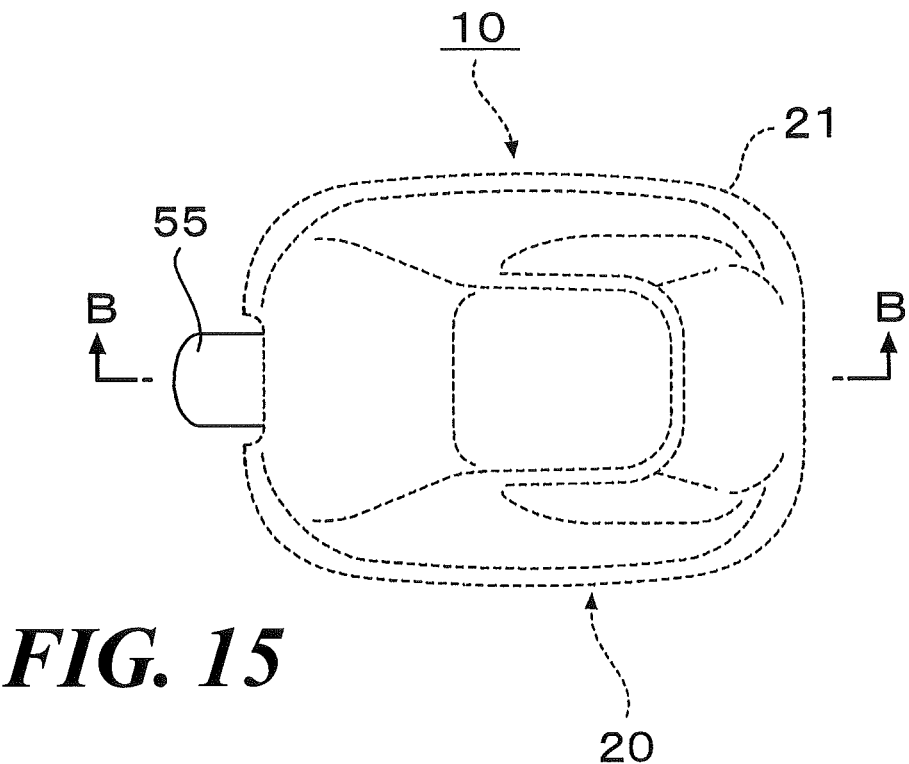
FIG. 15 is a plan view of the sunvisor holder.
Figure 16:
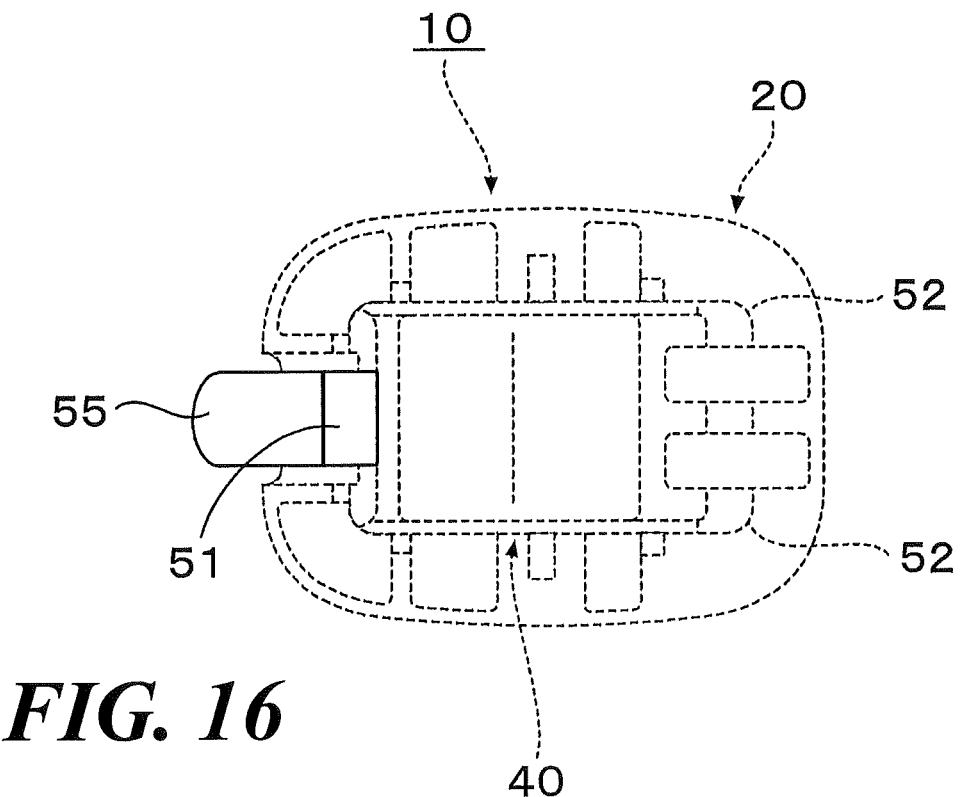
FIG. 16 is a bottom view of the sunvisor holder.
Figure 17:
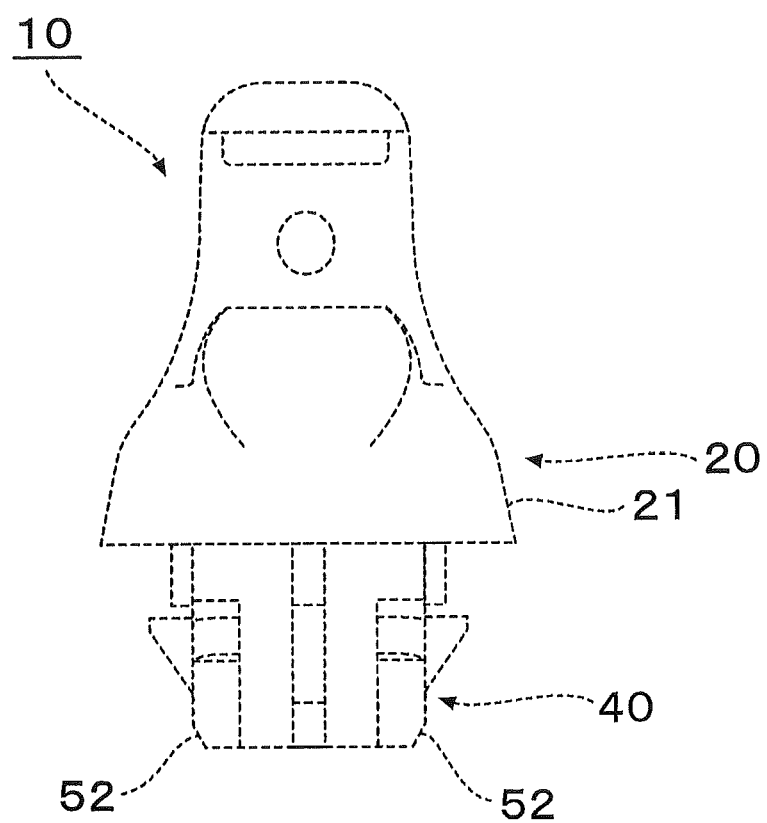
FIG. 17 is a right side view of the sunvisor holder.
Figure 18:
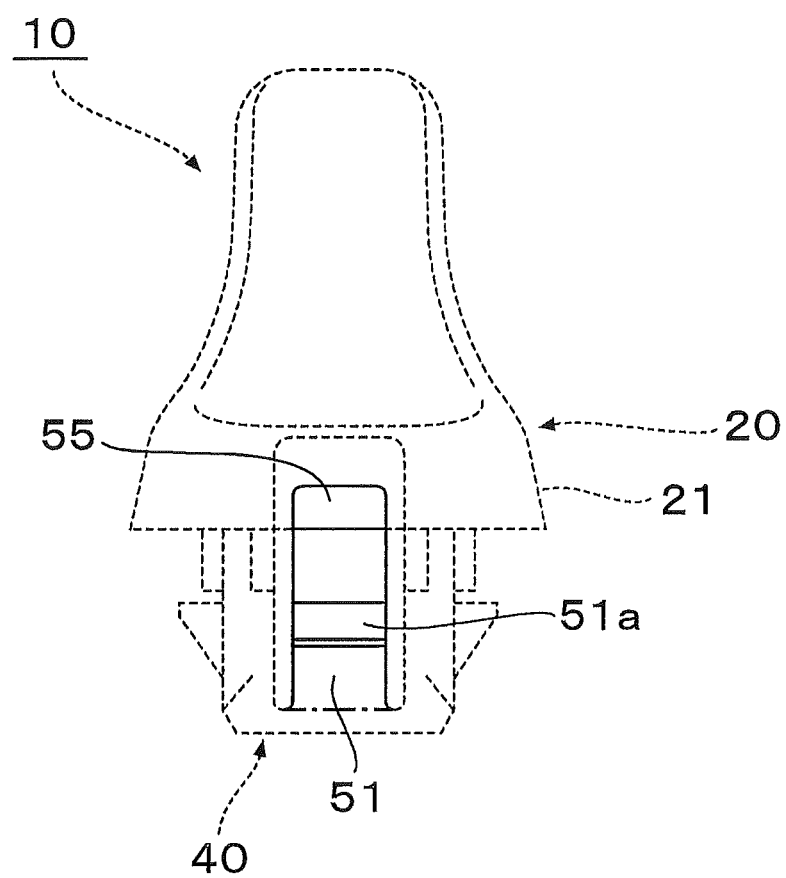
FIG. 18 is a left side view of the sunvisor holder.
Figure 19:
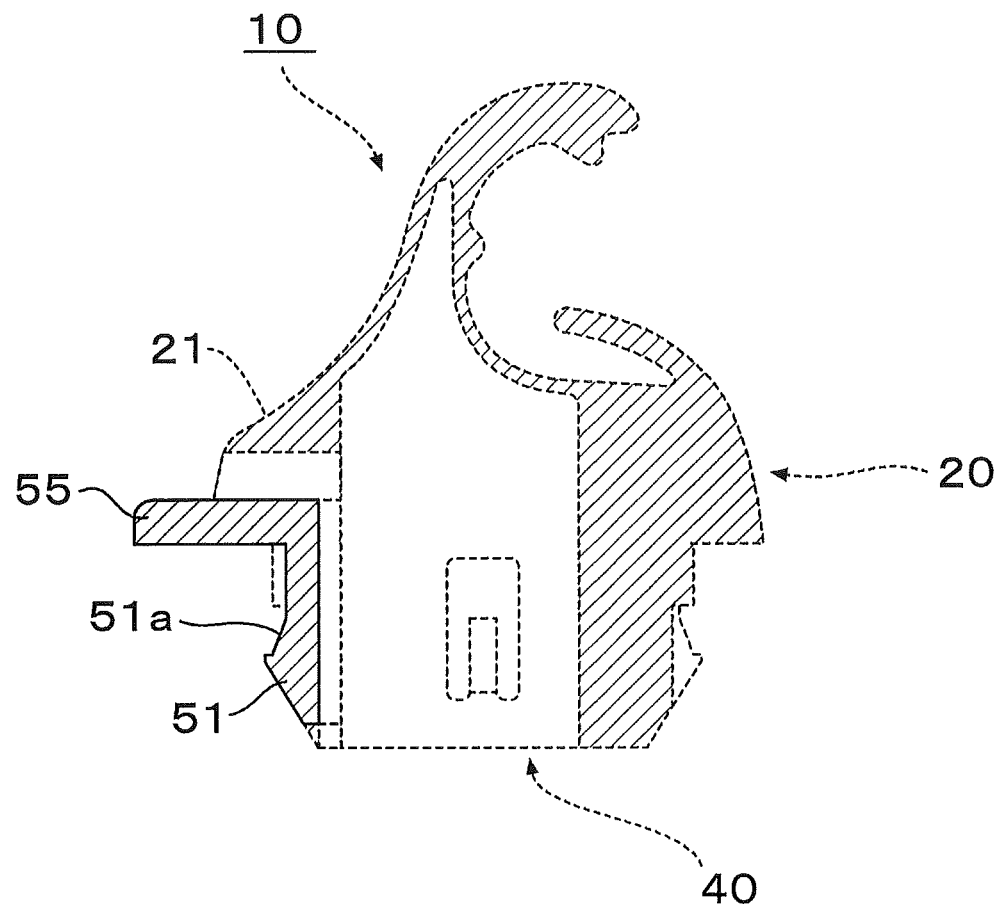
FIG. 19 is a cross-sectional view taken along the arrow line B-B of FIG. 15.

The first engaging piece 51 is provided to the connecting wall 44 that is the one disposed on the one end side in the longitudinal direction of the base portion 21 among the walls of the leg portion 40. To be specific, as shown in FIGS. 3A, 3B and 11, a U-shaped notch 53 communicating with the interior space 47 and the cavity 29 of the main body portion 20 is provided to the connecting wall 44 and a peripheral wall of the base portion 21 above the connecting wall 44 (see FIG. 11), and thus the first engaging piece 51 is bendable via the notch 53.

The base end of the first engaging piece 51 is connected with the distal end of the leg portion 40, and bendable inward of the leg portion with the distal end of the leg portion as a pivot point. The first engaging piece 51 has its outer surface of the base end form an inclined surface protruding gradually outward as the outer surface approaches the main body portion 20. The first engaging piece 51 includes an engaging portion 51a inclined so as to be lowered gradually from the most protruding portion. The engaging portion 51a engages with a back-side peripheral edge of the mounting hole 2 of the vehicle body panel 1 (see FIG. 4A).

A releasing portion 55 extends outward along the mounting surface of the vehicle inside wall from the free end of the first engaging piece 51. To be specific, the releasing portion 55 extends a predetermined length outwardly of the base portion 21 from the free end of the first engaging piece 51 via the notch 53 provided to the peripheral wall of the base portion 21 as shown in FIGS. 2A, 3A, 3B, and 6 to 9. The releasing portion 55 abuts on a top-side peripheral edge of the insertion hole 4 provided to the trim member 3 (see FIGS. 3A and 4A).

Figure 5:
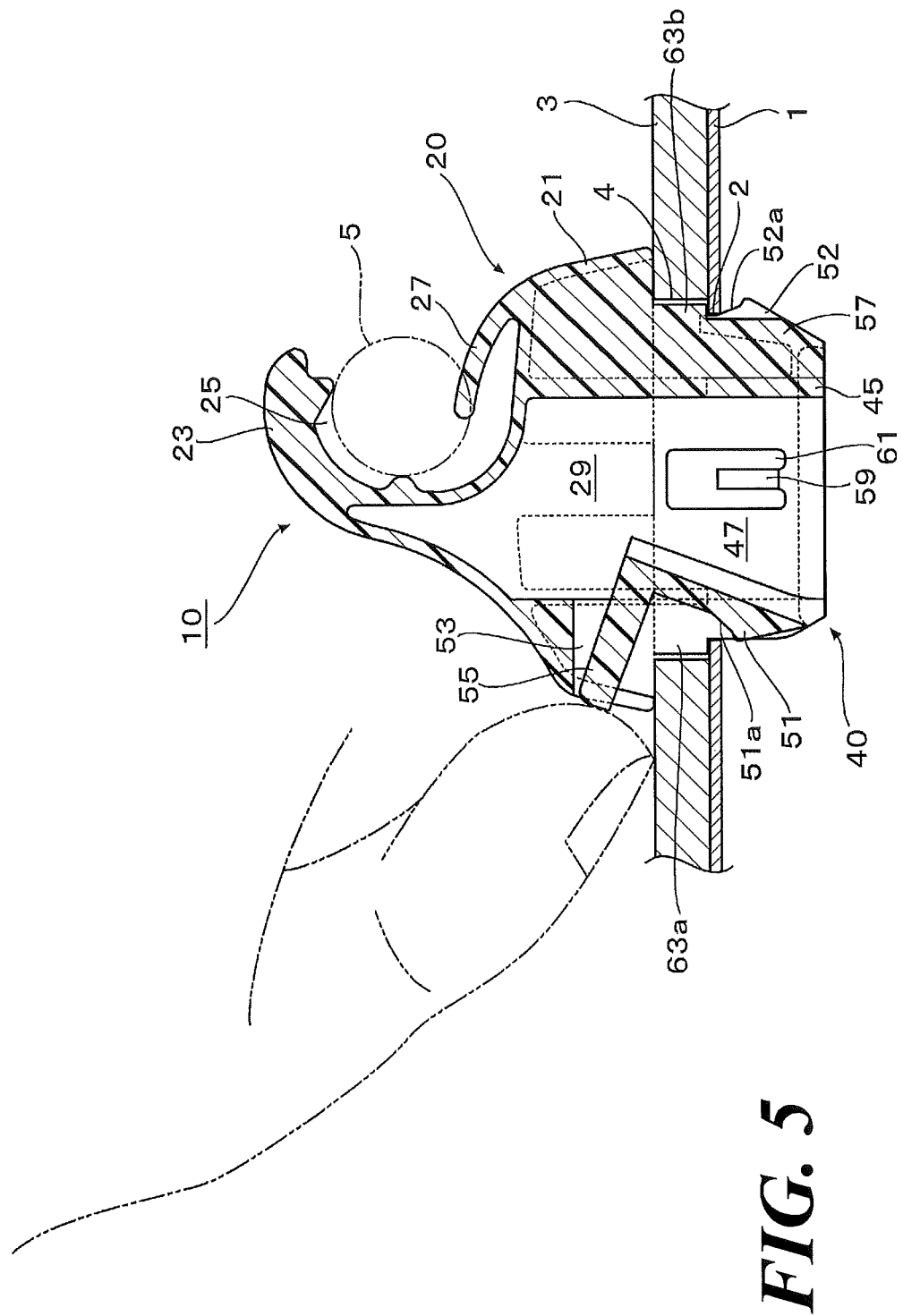
FIG. 5 is a cross-sectional view of the sunvisor holder at the time of being demounted from the mounting hole.
Figure 6:
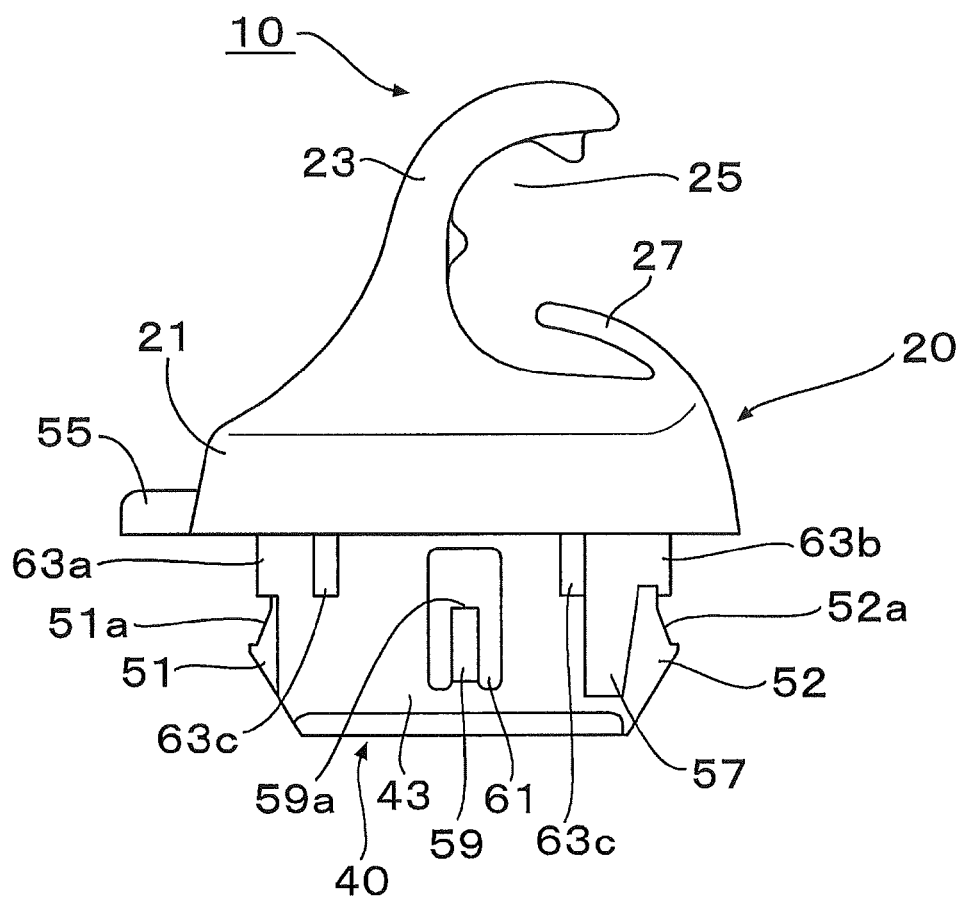
FIG. 6 is a front view of the sunvisor holder.
Figure 7:
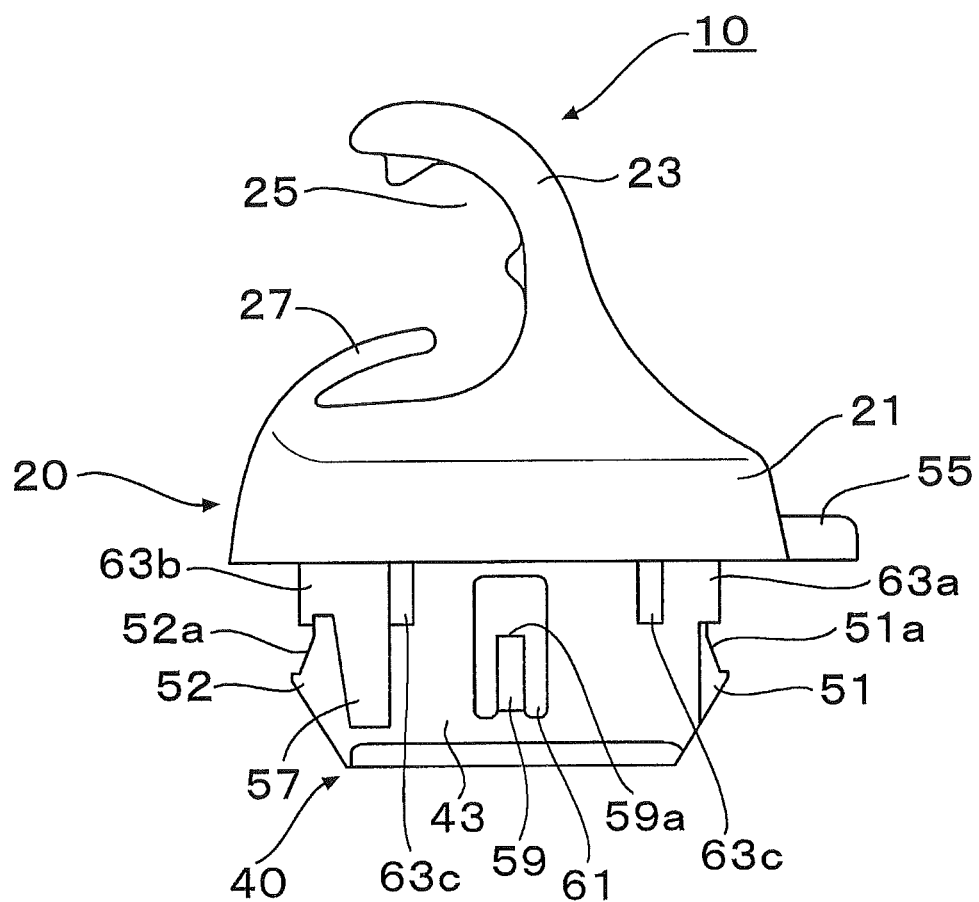
FIG. 7 is a rear view of the sunvisor holder.
Figure 8:
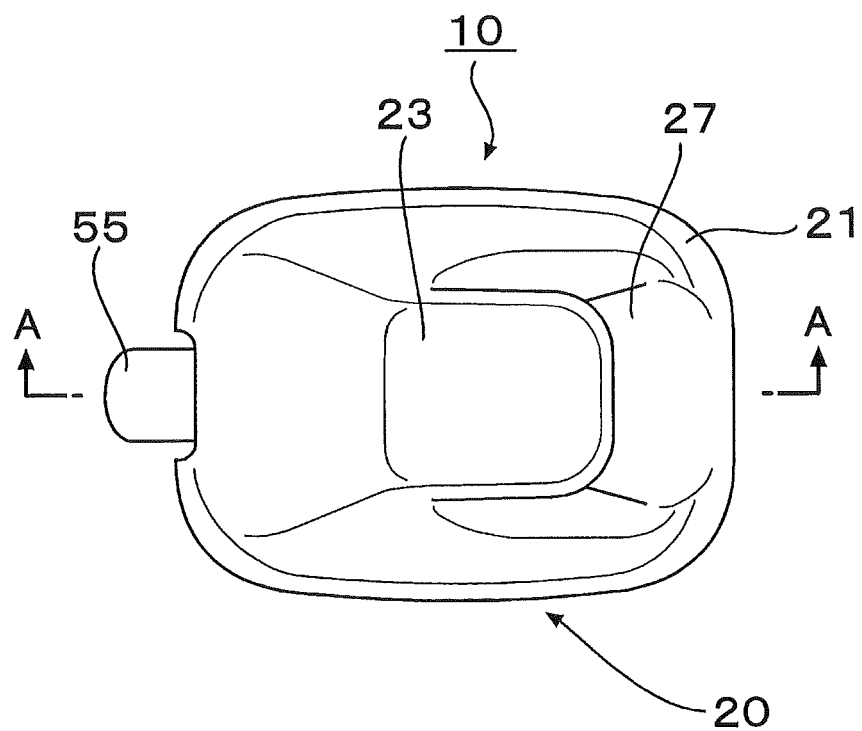
FIG. 8 is a plan view of the sunvisor holder.

According to the present, a length of the releasing portion 55 is set so as to protrude from an outer peripheral surface of the base portion 21 in a state where the first engaging piece 51 is bent via the releasing portion 55 and the engagement of the first engaging piece 51 with the mounting hole 2 is released as shown in FIG. 5.

Figure 4A:
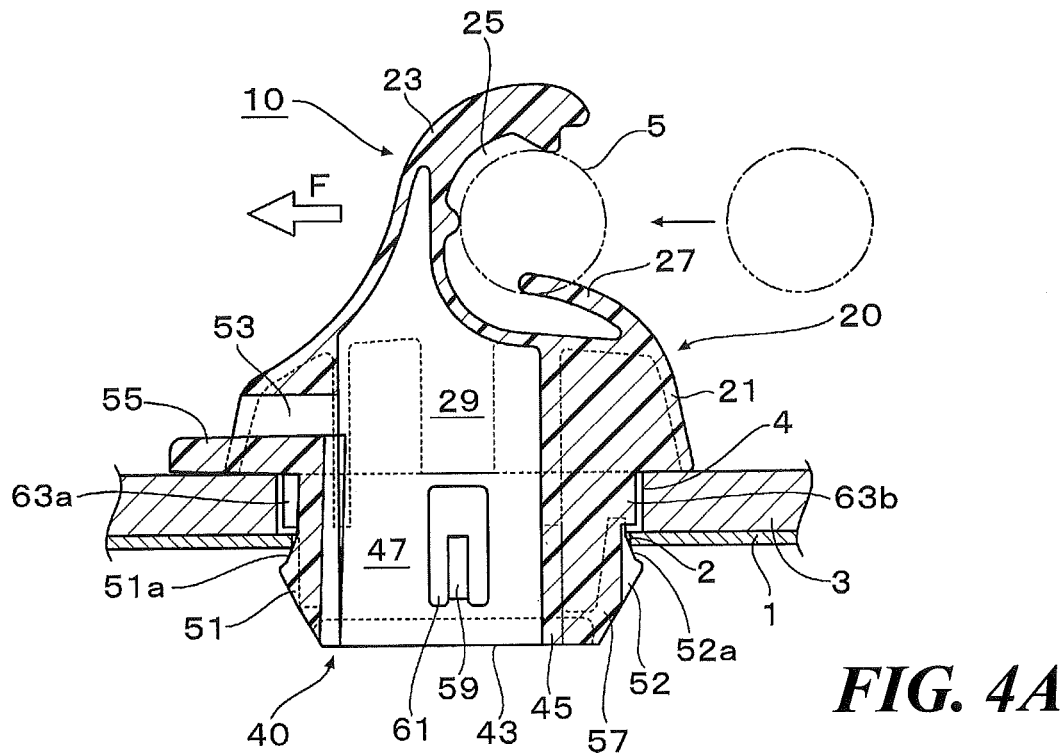
FIG. 4A is a cross-sectional view of the sunvisor holder in the state of being fixed to a mounting hole.

The releasing portion 55 is pressed inward of the leg portion from the top side of the trim member 3 as shown in FIG. 5 in a state where the engaging portion 51a of the first engaging piece 51 engages with the back-side peripheral edge of the mounting hole 2 (see FIG. 4A). Then, the releasing portion 55 moves in the cavity 29 of the base portion 21 to have its distal end rise from the surface of the trim member 3, and the first engaging piece 51 moves in the interior space 47 to be bent inward of the leg portion to make the engaging portion 51a disengage from the back-side peripheral edge of the mounting hole 2. Thus, the engagement of the first engaging piece 51 with the mounting hole 2 is released.

Figure 10:
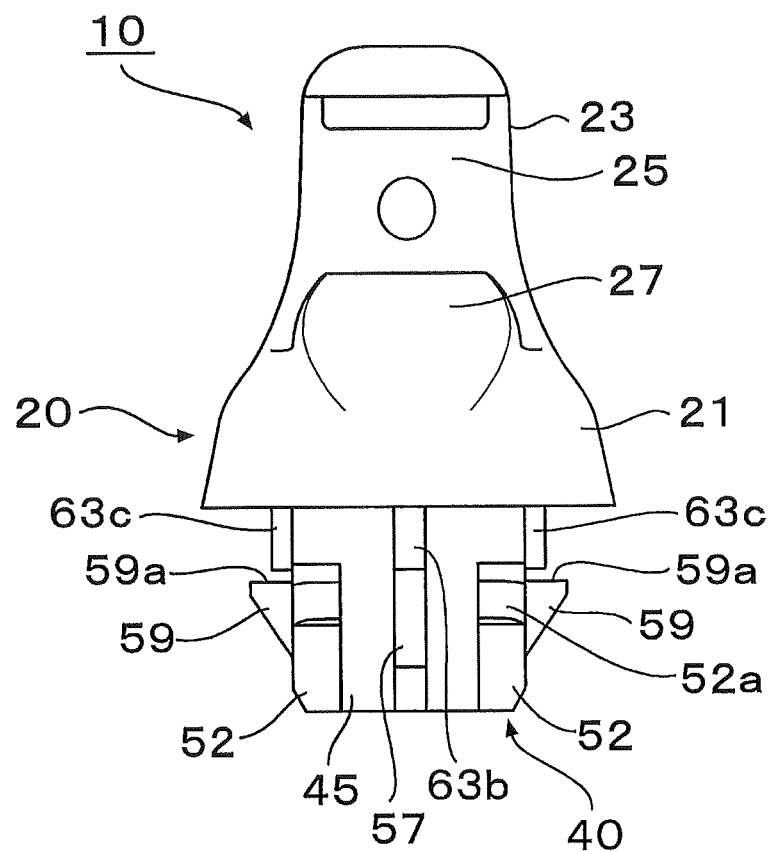
FIG. 10 is a right side view of the sunvisor holder.

The second engaging pieces 52 and 52 are provided bendable to the connecting wall 45 that is the one disposed on the other end side in the longitudinal direction of the base portion 21 among the walls of the leg portion 40 as shown in FIGS. 2B and 10.

The base end of each second engaging piece 52 is connected to the connecting wall 45 and extends obliquely outward to the main body portion 20. An engaging portion 52a engages with the back-side peripheral edge of the mounting hole 2 is provided to each second engaging piece 52 on the outer surface on the free end side (see FIG. 4A). As long as at least one second engaging piece 52 is provided to engage with the mounting hole 2 in a collaborative manner with the first engaging piece 51, the number of the second engaging piece 52 is not limited to the present embodiment. A rib 57 extends in the middle of the connecting wall 45 in the width direction so as to be disposed between the lightening holes 31a and 31a of the base portion 21 (see FIGS. 2A and 9).

Among the walls of the leg portion 40, the pair of side walls 43 and 43 include temporary holding pieces 59 and 59 that are bendable inward of the leg portion, and are disposed in the middle of the side walls 43 and 43 in the width directions via U-shaped slits 61 as shown in FIGS. 2A, 2B, 6, and 7.

Each temporary holding piece 59 is tapered so as to protrude gradually as its outer surface approaches the main body portion 20. The upper end portion of each temporary holding piece 59 forms a planate engaging portion 59a that is perpendicular to the side wall 43.

The engaging portion 59a of each temporary holding piece 59 engages with the back-side peripheral edge of the insertion hole 4 of the trim member 3 while the base portion 21 and the releasing portion 55 abut on the top-side peripheral edge of the insertion hole 4. Thus, the sunvisor holder 10 is temporarily held with respect to the trim member 3 (see FIGS. 3A and 3B).

The engaging portion 59a of each temporary holding piece 59 is disposed closer to the main body portion 20 than the engaging portion 51a of the first engaging piece 51 and the engaging portions 52a of the second engaging pieces 52 are. Thus, while each temporary holding piece 59 engages with the back-side peripheral edge of the insertion hole 4 of the trim member 3 in a state where the sunvisor holder 10 is temporarily held (see FIG. 3B), each temporary holding piece 59 does not engage with the mounting hole 2 but is left bent inward when the first engaging piece 51 engages with the mounting hole 2 of the vehicle body panel 1 (see FIG. 4B).

The leg portion 40 includes plural protruding portions on its upper outer circumference. To be specific, protruding portions 63a and 63a protrude on the peripheral edge of the upper notch 53 of the connecting wall 44, a protruding portion 63b protrudes on the upper end of the rib 57 of the connecting wall 45, and protruding portions 63c and 63c protrude on both sides of the upper side walls 43 and 43 in the width direction as shown in FIGS. 6, 7, and 9 to 11. These protruding portions 63a, 63b, and 63c are disposed inside of the insertion hole 4 of the trim member 3 to prevent rattling of the sunvisor holder 10 (see FIGS. 3A and 3B). The lower end portions of protruding portions 63a, 63b, and 63c are capable of abutting on the top-side peripheral edge of the mounting hole 2 of the vehicle body panel 1 (see FIGS. 4A and 4B).

Next, how to use the sunvisor holder 10 having the above-described configuration will be described.

First, the leg portion 40 of the sunvisor holder 10 is inserted into the insertion hole 4 from the top side of the trim member 3 as shown in FIG. 1. Then, the first engaging piece 51, the second engaging pieces 52 and 52, and the temporary holding pieces 59 and 59 pass through the insertion hole 4 while being pressed by the inner circumference of the insertion hole 4 to be bent inward, and get out from the back side of the insertion hole 4 to flexibly return. Then, the engaging portion 59a of each temporary holding piece 59 engages with the back-side peripheral edge of the insertion hole 4 (see FIG. 3B) and the base portion 21 of the main body portion 20 abuts on the top-side peripheral edge of the insertion hole 4 while the releasing portion 55 abuts on the top-side peripheral edge of the insertion hole 4 (see FIG. 3A). While the plural protruding portions 63 provided to the walls of the leg portion 40 are disposed on the inner circumference of the insertion hole 4, the sunvisor holder 10 is temporarily held by the trim member 3.

As described above, inserting the leg portion 40 into the insertion hole 4 of the trim member 3 makes the temporary holding pieces 59 engage with the back-side peripheral edge of the insertion hole 4 and makes the releasing portion 55 abut on the top-side, which allows the trim member 3 to temporarily hold the sunvisor holder 10 reliably in the present embodiment.

Then, while the trim member 3 temporarily holds the sunvisor holder 10 and the distal end of the leg portion 40 protrudes from the back side of the insertion hole 4, the whole trim member 3 is pushed toward the vehicle body panel 1, and the leg portion 40 of the sunvisor holder 10 is inserted into the mounting hole 2 from the top side of the vehicle body panel 1. Then, the first engaging piece 51, the second engaging pieces 52 and 52, and the temporary holding pieces 59 and 59 are pressed by the inner circumference of the mounting hole 2 to be bent inward of the leg portion. When the engaging portion 51a of the first engaging piece 51 and the engaging portions 52a of the second engaging pieces 52 pass through the mounting hole 2, the first engaging piece 51 and the second engaging pieces 52 flexibly return to engage with the back-side peripheral edge of the mounting hole 2 while the protruding portions 63a, 63b, and 63c provided around the leg portion abut on the top-side peripheral edge of the mounting hole 2, and further the temporary holding pieces 59 and 59 are bent inward and kept abutting on the inner circumference of the mounting hole 2 (see FIGS. 4A and 4B).

Figure 4B:
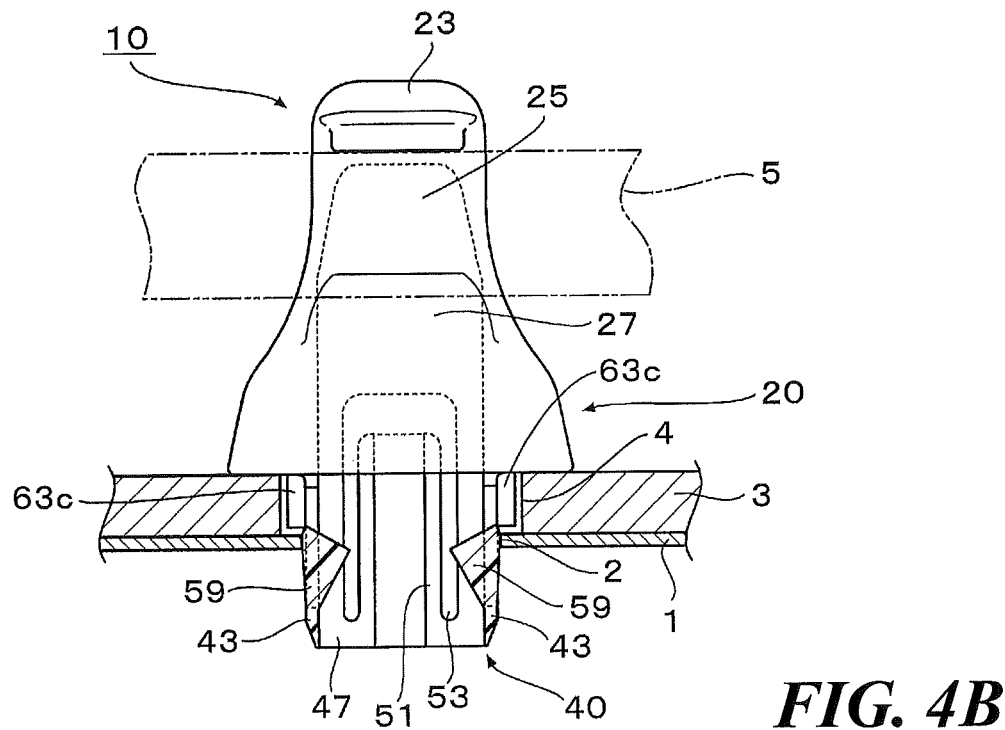
FIG. 4B is a side view where only the leg portion is shown in cross section in the fixed state.

As a result, the sunvisor holder 10 can be mounted on the mounting hole 2 in a state where the base portion 21 and the releasing portion 55 abutting on the insertion hole 4 of the trim member 3, the plural protruding portions 63a, 63b, and 63c abutting on the top-side peripheral edge of the mounting hole 2 of the vehicle body panel 1, and the first engaging piece 51 and the second engaging pieces 52 engaging with the back-side peripheral edge of the mounting hole 2 sandwich the vehicle body panel 1 and the trim member 3 therebetween while the soft trim member 3 is slightly flattened (see FIGS. 4A and 4B).

Then, when the shaft 5 of the sunvisor is inserted into the holding portion 23 through the opened insertion portion 25, the shaft 5 is held rotatably by the holding portion 23 in an attachable and detachable manner in a state where the presser piece 27 elastically abuts on the shaft outer circumference and rattling of the shaft 5 is prevented. Thus, the sunvisor can be fixed to the vehicle body panel 1 and the trim member 3.

When the shaft 5 of the sunvisor is inserted into the holding portion 23 through the insertion portion 25 as described above, a pushing force F is exerted on the sunvisor holder 10 as shown in FIG. 4A. At this time, because the releasing portion 55 provided to the free end of the first engaging piece 51 is disposed opposite to the insertion portion 25, and extends outward along the surface of the trim member 3, the releasing portion 55 abuts on the top-side peripheral edge of the insertion hole 4 of the trim member 3 to thereby receive the above-described pushing force F. Thus, the sunvisor holder 10 can be prevented from getting inclined, and the shaft 5 of the sunvisor can be held reliably.

When the sunvisor holder 10 needs to be demounted from the mounting hole 2 of the vehicle body panel 1 for the reason of component replacement, maintenance, recycling, or the like, the releasing portion 55 is pushed inward of the leg portion from the top side of the trim member 3. Then, as shown in FIG. 5, the releasing portion 55 moves in the cavity 29 of the base portion 21 to have its distal end rise with respect to the surface of the trim member 3, and the first engaging piece 51 moves in the interior space 47 to be bent inward of the leg portion to make the engaging portion 51a disengage from the back-side peripheral edge of the mounting hole 2. Thus, the engagement of the first engaging piece 51 with the mounting hole 2 is released. By pulling the leg portion 40 out of the mounting hole 2 of the vehicle body panel 1 and the insertion hole 4 of the trim member 3 while maintaining this state, the sunvisor holder 10 can be demounted.

At this time, in the sunvisor holder 10, pressing the releasing portion 55 has its distal end rise from the surface of the trim member 3, so that an operator's finger is easily hooked on the distal end of the releasing portion 55, which allows a smooth demounting operation of the sunvisor holder 10.

According to the present embodiment, a length of the releasing portion 55 is set so as to protrude from the outer peripheral surface of the base portion 21 in a state where the engagement of the first engaging piece 51 with the mounting hole 2 is released as shown in FIG. 5A. Thus, pressing the releasing portion 55 can reliably release the engagement of the first engaging piece 51 with the mounting hole 2, and in a sate where the engagement is released, makes the releasing portion 55 protrude from the outer peripheral surface of the base portion 21 to rise from the surface of the trim member 3. Thus, an operator's finger can be reliably hooked on the distal end of the releasing portion 55, which can improve the workability of demounting the sunvisor holder 10.

According to the present embodiment, the leg portion 40 has a frame shape defining the interior space 47 while the base portion 21 of the main body portion 20 defines the cavity 29 communicating with the interior space 47, so that pressing the releasing portion 55 pushes the first engaging piece 51 into the interior space 47 of the leg portion 40 and the cavity 29 of the base portion 21 as shown in FIG. 5. Thus, a pushing stroke of the first engaging piece 51 via the releasing portion 55 can be sufficiently secured. Because the interior space 47 is provided to the leg portion 40 and the cavity 29 is provided to the base portion 21, the sunvisor holder 10 is effectively lightened, which can contribute to weight reduction.

In the present embodiment, because not only the cavity 29 is provided to the base portion 21 of the main body portion 20, but also the plural lightening holes 31 are provided to the main body portion 20 as shown in FIGS. 3A and 9, weight reduction of the sunvisor holder 10 can be more effectively achieved.

FIGS. 13 to 19 are attached in preparation for possible conversion of this patent application into a design application. The portions indicated with solid lines may be eligible for a partial design. The alternate long and short dashed lines in FIGS. 18 and 19 merely indicate borders between the portions to be pursued as a partial design and the other portions.

DESCRIPTION OF REFERENCE NUMERALS AND SIGNS

1 Vehicle body panel
2 Mounting hole
3 Trim member
4 Insertion hole
5 Shaft
10 Sunvisor holder
20 Main body portion
31 Base portion
23 Holding portion
25 Insertion portion
29 Cavity
40 Leg portion
47 Interior space
51 First engaging piece
52 Second engaging piece
53 Notch
55 Releasing portion
59 Temporary holding piece

The invention claimed is:

1. A sunvisor holder to be mounted on a vehicle inside wall via a mounting hole provided to a vehicle body panel so as to hold a shaft of a sunvisor in an attachable and detachable manner, the sunvisor holder including:
a main body portion disposed on a top side of the vehicle inside wall; and
a leg portion to be inserted into and fixed to the mounting hole of the vehicle body panel,
wherein the main body portion includes:
a base portion to be abutted on the top side of the vehicle inside wall;
a holding portion extending from the base portion and being shaped so as to hold the shaft of the sunvisor in an attachable and detachable manner; and
an insertion portion provided to the holding portion so as to receive the shaft of the sunvisor,
wherein the leg portion includes:
a first engaging piece disposed on a side opposite to the insertion portion of the main body portion so as to engage with the mounting hole; and
at least one second engaging piece disposed at a position different from the first engaging piece so as to engage with the mounting hole in a collaborative manner with the first engaging piece,
wherein the first engaging piece is formed via a notch provided to a peripheral wall of the base portion so as to be bendable inward with a distal end of the leg portion as a pivot point, includes a releasing portion extending outward more than the base portion along a mounting surface of the vehicle inside wall from a free end of the first engaging piece, and disposed only on the side opposite to the insertion portion of the main body portion,
wherein, when the shaft of the sunvisor is inserted into the holding portion through the insertion portion, the releasing portion abuts on the top side of the vehicle inside wall to thereby receive a pushing force exerted from the shaft of the sunvisor, and
wherein, when the releasing portion is pressed from the top side of the vehicle inside wall, the first engaging piece is bent inward to release an engagement of the first engaging piece with the mounting hole.

2. The sunvisor holder according to claim 1,
wherein a length of the releasing portion is set so as to protrude from an outer peripheral surface of the base portion in a state where the releasing portion is pressed and the engagement of the first engaging piece with the mounting hole is released.

3. The sunvisor holder according to claim 1,
wherein the leg portion includes a frame-shaped wall defining an interior space, and the base portion defines a cavity communicating with the interior space,
wherein the first engaging piece and the releasing portion are provided via the notch communicating with the interior space of the frame-shaped wall and the cavity of the base portion, and
wherein, when the releasing portion is pressed, the first engaging piece is pushed into the interior space of the frame-shaped wall and the cavity of the base portion.

4. The sunvisor holder according to claim 1,
wherein the vehicle inside wall includes a trim member including an insertion hole and disposed on a top side of the vehicle body panel,
wherein the leg portion includes a temporary holding piece provided to engage with a back-side peripheral edge of the insertion hole of the trim member, and
wherein, when the temporary holding piece engages with the back-side peripheral edge of the insertion hole, the releasing portion abuts on a top side of the trim member.

* * * * *